United States Patent
Sugar et al.

(10) Patent No.: US 8,687,560 B2
(45) Date of Patent: Apr. 1, 2014

(54) UNSYNCHRONIZED TIME-OF-FLIGHT-BASED WIRELESS POSITIONING SYSTEM USING NETWORK BROADCASTS

(71) Applicant: Diani Systems, Inc., Ijamsville, MD (US)

(72) Inventors: Gary L. Sugar, San Francisco, CA (US); Yohannes Tesfai, Silver Spring, MD (US); Chandra Vaidyanathan, Rockville, MD (US)

(73) Assignee: Diani Systems, Inc., Ijamsville, MD (US)

( * ) Notice: Subject to any disclaimer, the term of this patent is extended or adjusted under 35 U.S.C. 154(b) by 0 days.

(21) Appl. No.: 13/968,837

(22) Filed: Aug. 16, 2013

(65) Prior Publication Data

US 2014/0045522 A1  Feb. 13, 2014

Related U.S. Application Data

(63) Continuation-in-part of application No. 13/602,451, filed on Sep. 4, 2012, which is a continuation-in-part of application No. 13/355,557, filed on Jan. 22, 2012, now Pat. No. 8,265,011, which is a continuation-in-part of application No. 13/286,649, filed on Nov. 1, 2011, now Pat. No. 8,179,816.

(60) Provisional application No. 61/836,281, filed on Jun. 18, 2013.

(51) Int. Cl.
*H04W 4/00* (2009.01)

(52) U.S. Cl.
USPC ........ 370/328; 375/148; 375/260; 455/456.1; 455/456.2

(58) Field of Classification Search
CPC ......... H04W 64/00; H04W 4/02; H04W 4/22; H04W 24/00; H04M 3/42
See application file for complete search history.

(56) References Cited

PUBLICATIONS

Martin et al, "Algorithms and Bounds for Distributed TDOA-Based Positioning Using OFDM Signals," IEEE Transactions on Signal Processing, vol. 59, No. 3, Mar. 2011.
Fan et al, "Asynchronous Differential TDOA for Sensor Self-Localization," IEEE, ICASSP, 2007.
Yan et al, "Asynchronous Differential TDOA for Non-GPS Navigation Using Signals of Oppourtunity," IEEE, ICASSP, 2008.
E. Lindskog et al, "Client Positioning using Timing Measurements between Access Points", IEEE 802.11 working group submission, Aug. 15, 2013, doc # IEEE 802.11-13/0072r1.

*Primary Examiner* — Jung Park
(74) *Attorney, Agent, or Firm* — John R. Kasha; Kelly L. Kasha; Kasha Law LLC (57) ABSTRACT

In a positioning system, each network access device in a first subset of N1 network access devices transmits a wireless location beacon signal, producing N1 wireless location beacon signals that are transmitted by the first subset. Each network access device in a second subset of N2 network access devices receives the Ni wireless location beacon signals from the first subset and calculates N1 TOAs from each of the N1 received wireless location beacon signals, producing N1×N2 calculated TOAs by the second subset. Using one or more wireless transmissions, one or more network access devices transmits the location coordinates of the network access devices and transmits the N1×N2 calculated TOAs, differences calculated among the N1×N2 calculated TOAs, or a combination of one or more of the N1×N2 calculated TOAs and one or more of the differences calculated among the N1×N2 calculated TOAs.

30 Claims, 7 Drawing Sheets

210  Cluster of N=7 cells.

220  Cell served by master AP

230  Cell served by subordinate AP

UNSYNCHRONIZED TIME-OF-FLIGHT-BASED WIRELESS POSITIONING SYSTEM USING NETWORK BROADCASTS

CROSS-REFERENCE TO RELATED APPLICATION

This application is a continuation-in-part application of U.S. patent application Ser. No. 13/602,451 filed Sep. 4, 2012, which is a continuation-in-part application of U.S. patent application Ser. No. 13/355,557 filed Jan. 22, 2012, now U.S. Pat. No. 8,265,011, which is a continuation-in-part application of U.S. patent application Ser. No. 13/286,649 filed Nov. 1, 2011, now U.S. Pat. No. 8,179,816. This application also claims the benefit of U.S. Provisional Patent Application No. 61/836,281 filed Jun. 18, 2013. All of the above mentioned applications are incorporated by reference herein in their entireties.

INTRODUCTION

Many well-known wireless positioning systems use time of arrival (TOA) or time-difference-of-arrival (TDOA) techniques to measure range or distance between network terminals. With the Global Positioning System (GPS), perhaps the most well known example, mobile receivers measure TOAs of signals transmitted by multiple satellites at known times and positions to determine their relative distances to each of the satellites, and then use trilateration to determine their position. A well-known challenge with these systems is the synchronization that is required to keep the system operating properly. For example, GPS satellites must be tightly synchronized in order for the mobile receivers to determine their relative distances. Even small timing errors of a few nanoseconds can degrade positioning accuracy significantly.

Synchronization of the network nodes is a non-trivial exercise, especially when high-accuracy positioning is required. For example, if a positioning accuracy of 3 feet is required, then since light travels about one foot per nanosecond, this means that the network nodes must be synchronized to well below +/−3 ns (more like +/−0.3 ns) to avoid becoming a major error source in the system. This kind of synchronization cannot be achieved through switched wired networks like Ethernet; either a dedicated wired overlay network or some sort of wireless approach is required.

One well-known time-of-flight-based approach that does not require network synchronization uses so-called round-trip-time (RTT) measurements: a mobile device sends a wireless signal to a network device at a known position, which in turn sends back an acknowledgment signal. The mobile measures the RTT, subtracts off any known or estimated processing delays in the network device, and multiplies by half the speed of light to get an estimate of the distance between the two devices. The mobile repeats this measurement on several more network devices and then uses trilateration to determine its position. The benefit of this approach is that it doesn't require network synchronization. The disadvantages are (1) more battery energy consumed by the mobile device to determine its position, and (2) more network bandwidth dedicated to positioning than, say, an approach that uses network broadcasts, and that bandwidth increases in proportion to the number of mobile devices being located.

BRIEF DESCRIPTION OF THE DRAWINGS

The skilled artisan will understand that the drawings, described below, are for illustration purposes only. The drawings are not intended to limit the scope of the present teachings in any way.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Various embodiments, each using a technique referred to herein as Asynchronous Broadcast Differential Time of Flight (AB-DTOF) positioning, are described below. The AB-DTOF approach allows one or more mobile wireless devices to self-locate by monitoring periodic broadcasts from a plurality of wireless network nodes. AB-DTOF doesn't require synchronization among the network nodes, and doesn't require transmissions from the mobile devices, so it saves mobile battery energy and uses less network bandwidth than other asynchronous techniques such as RTT described earlier.

System Overview

Figure 1:
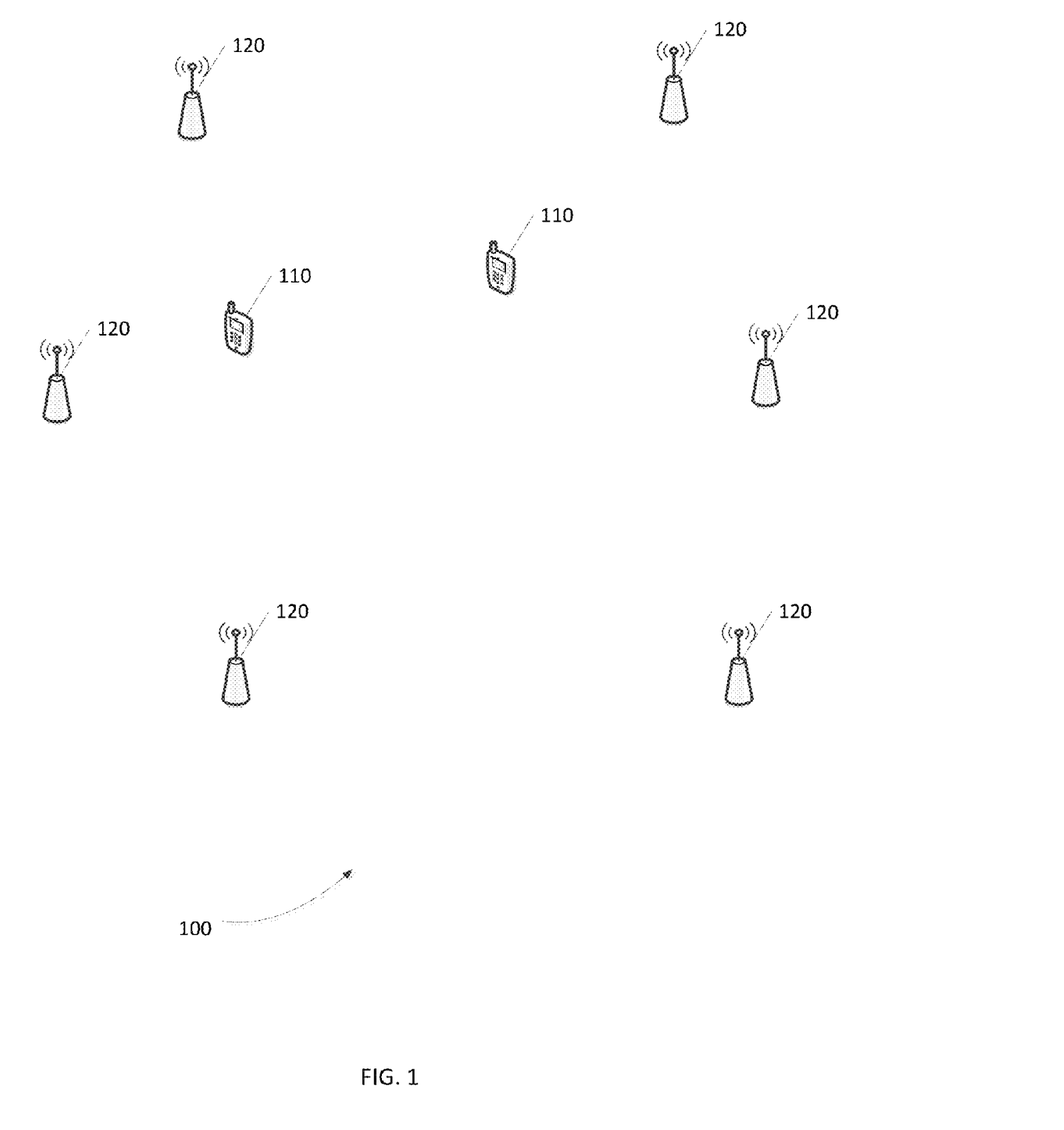
FIG. 1 shows a block diagram of an AB-DTOF positioning system, in accordance with various embodiments.

FIG. 1 shows a block diagram of an AB-DTOF positioning system 100, in accordance with various embodiments. System 100 includes one or more mobile devices 110, and a plurality of network node devices 120. The mobile devices 110 are typically battery-powered mobile wireless devices such as smartphones, laptop computers or smart-tags that contain a chipset that deploys a wireless standard such as IEEE 802.11/WiFi or cellular LTE. The network nodes 120 are typically IEEE 802.11/WiFi wireless Access Points (APs) or cellular LTE micro or nano base stations (with a typically wired interface to their backhaul network) placed in various known positions in an indoor environment such as a hospital, retail store or a shopping mall. To simplify the discussion, we will from this point onward assume that an IEEE 802.11/WiFi standard is being used unless otherwise noted, and use the terms "network nodes", "network access devices" and "WiFi Access Points (APs)" interchangeably. Although most of the discussion is geared toward IEEE 802.11/WiFi, the same basic approach could be modified to support other wireless standards such as 2G, 3G or 4G cellular as well.

Figure 2:
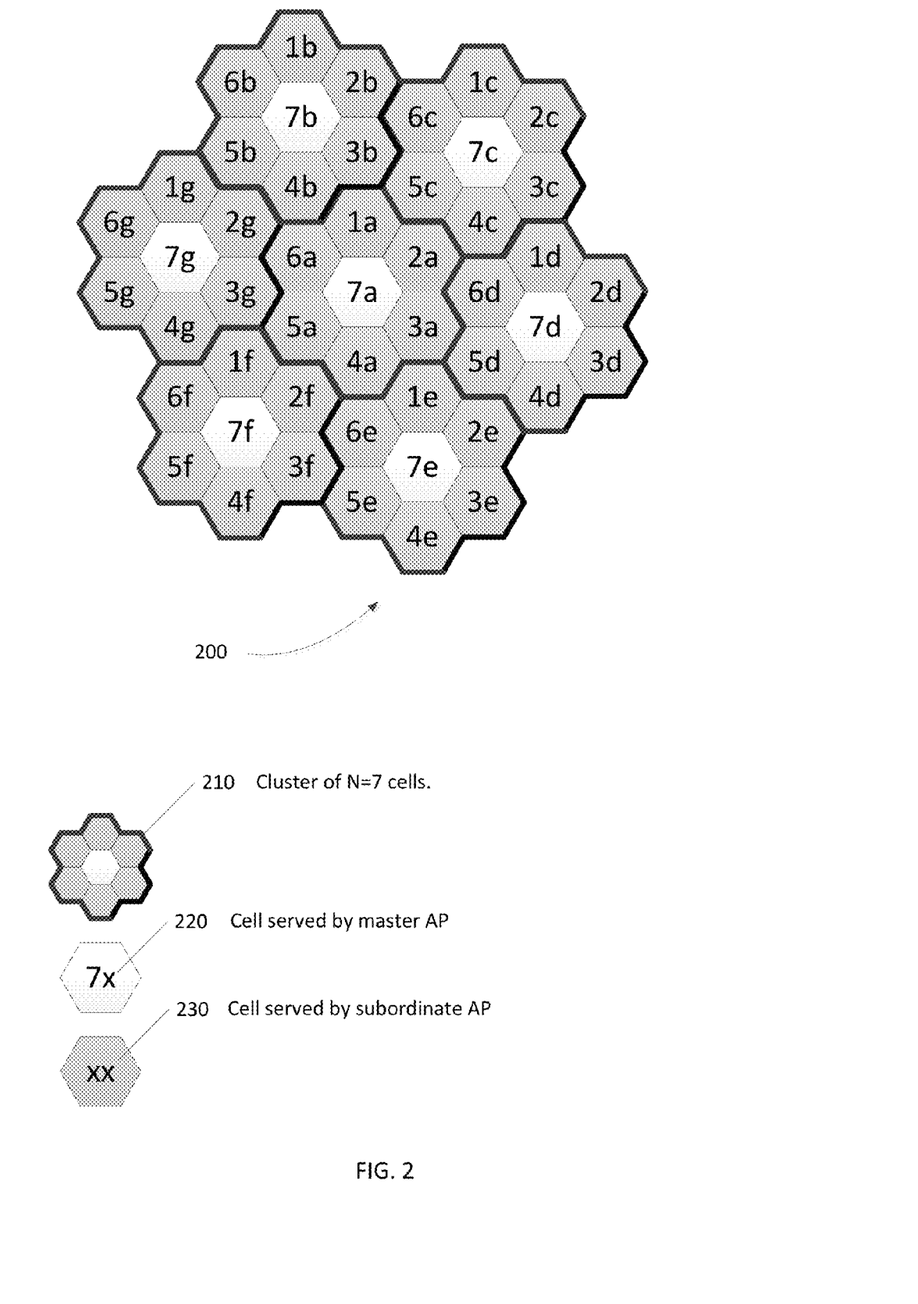
FIG. 2 shows a method for partitioning the cells in a large wireless network into clusters, and assigning master and subordinate APs, in accordance with various embodiments.

Referring to FIG. 2, in various embodiments, the cellular regions covered by each AP are partitioned 200 into clusters 210 of N cells. Typically N=7 but in theory it can be as small as 2 for two-dimensional positioning. The AP serving the center cell 220 of each cluster is the master AP; the APs 230 serving the remaining cells in each cluster are its subordinates.

Figure 4:
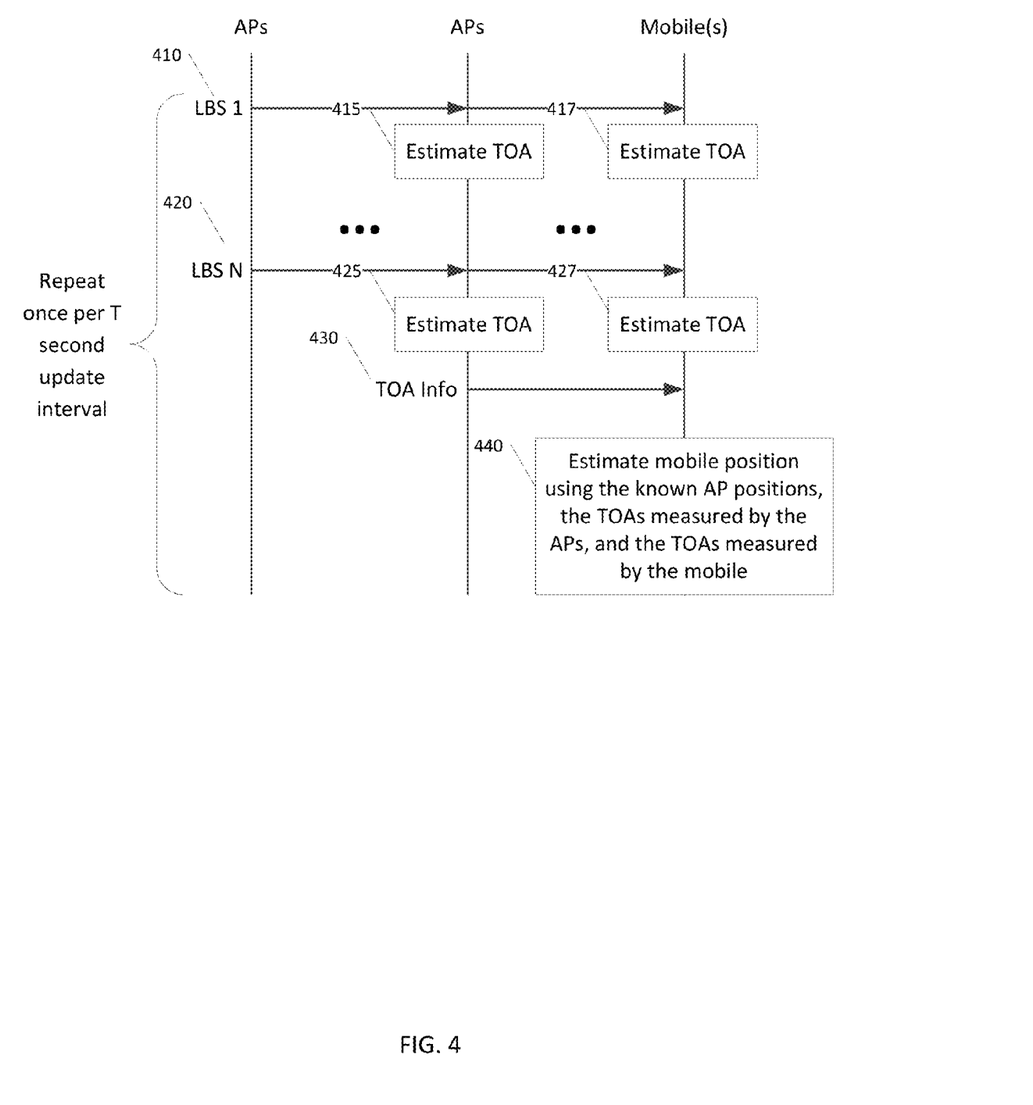
FIG. 4 shows a high-level description of the AB-DTOF technique, in accordance with various embodiments.

FIG. 4 describes how AB-DTOF works at the highest level. Every T second update interval (T is typically one second), the APs in each cluster broadcast location beacon signals (LBSs) 410, 420 in round-robin fashion, beginning with the master AP. The LBSs could be WiFi broadcast packets such as clear-to-send (CTS) packets, or more generic WiFi multicast packets, or as we will see later on in this description, TF-WB sequences, i.e., sequences of broadcast packets sent at different times and frequencies, as described in U.S. Pat. No. 8,179, 816.

When not transmitting, each AP listens to the other APs' LBS transmissions, measures their time of arrivals (TOAs) 415 425, and broadcasts the TOA measurements to the mobile device(s) in the form of a "TOA Info" message 430. The mobile device(s) also listen to the LBSs sent by the APs and measure their own TOAs 417 427, and after receiving the APs' TOA measurements via the "TOA Info" message 430, estimate 440 the mobile device positions using the AP TOA measurements, their own TOA measurements, and the known positions of the APs.

In general, for integers k, n and m between 1 and the number of APs per cluster N, the Rx time difference of arrival $TDOA_{k,n,m}$ at AP k for the signals sent by APs n and m can be shown to be related to the 3 AP positions $u_k$, $u_n$ and $u_m$ by $$TDOA_{k,n,m} \triangleq TOA_{k,n} - TOA_{k,m} = \frac{\|u_k - u_n\|}{c} - \frac{\|u_k - u_m\|}{c} + t_n - t_m, \quad (1)$$

where c is the speed of light, $t_n$ and $t_n$ are the unknown transmit times for the location beacons sent from APs n and m, respectively, and $TOA_{k,n}$ and $TOA_{k,m}$ are the TOAs of these signals at AP k.

A similar formula relates the TDOA at the mobile device at position u to its distance from the APs for the same two transmissions:

$$TDOA0_{n,m} \triangleq TOA0_n - TOA0_m = \frac{\|u - u_n\|}{c} - \frac{\|u - u_m\|}{c} + t_n - t_m. \quad (2)$$

Subtracting equation (2) from (1) and re-arranging terms gives $$\|u_k - u_n\| - \|u_k - u_m\| - \|u - u_n\| + \|u - u_m\| = c(TDOA_{k,n,m} - TDOA0_{n,m}). \quad (3)$$

The AP positions $u_k$, $u_n$ and $u_m$ are known by the mobile device, the TDOAs $TDOA_{k,n,m}$ measured by the APs are known via the TOA Info message, and the TDOAs $TDOA0_{n,m}$ computed by the mobile device are obviously known, so the only unknowns in equation (3) are the mobile location coordinates u=[x, y, z]. If the number of APs per cluster N is at least 3, we'll have at least 3 independent equations in (3) to account for the 3 unknowns and can solve for the mobile position u (for 2D positioning, u=[x, y] so in this case N can be as small as 2 to solve for u).

The MMSE solution for the mobile position u in (3) given the known AP positions and the TDOAs measured at the APs and the mobile can be written $$\hat{u} = \underset{u}{\operatorname{argmin}} \sum_{k=1}^{N} \sum_{m=1}^{N} \sum_{n=m+1}^{N} F_{k,n,m}(u), \quad (4)$$

where $$F_{k,n,m}(u) = [\|u_k - u_n\| - \|u_k - u_m\| - \|u - u_n\| + \|u - u_m\| - c(TDOA_{k,n,m} - TDOA0_{n,m})]^2.$$

The summing range for the index variable n in the above expression is used to (1) avoid double-counting transmissions from the same APs, (2) avoid the case when the two transmitters are identical (i.e., n=m), as neither of these cases add any new or useful information that can be used to estimate the mobile's position.

For the case where one of the transmitting APs is also the receiving AP (i.e., n=k or m=k), the TOA at AP k is also the time-of-departure (TOD) at that AP. As a practical matter, for some APs it may be difficult or impossible to measure TOD without adding special hardware. In this case, we could modify equation (4) as follows $$\hat{u} = \underset{u}{\operatorname{argmin}} \sum_{k=1}^{N} \sum_{\substack{m=1 \\ m \neq k}}^{N} \sum_{\substack{n=m+1 \\ n \neq k}}^{N} F_{k,n,m}(u), \quad (5)$$

to avoid these cases albeit with slightly degraded performance.

Equation (4) (or (5), if appropriate) is a nonlinear function of multiple variables. Any one of a number of well-known techniques for solving such equations can be used, including the stochastic gradient method, the Newton method, etc.

Up to now it has been assumed that the receiving APs indexed by n and m in equations (1) through (5) broadcast their measured TOAs $TOA_{k,n}$ and $TOA_{k,m}$ to the mobile devices using the "TOA Info" message, and the mobiles then subtract them to get the TDOAs $TDOA_{k,n,m}$ before estimating their position using equation (4) or (5). An alternative to this approach that uses less wireless network bandwidth is for the APs to first send their measured TOAs to one AP or server in the network, then the one AP or server either broadcasts the TOAs to the mobile devices directly, or first computes the TDOAs and broadcasts them to the mobile devices. In various embodiments, the one AP or server sends a combination of TOAs and TDOAs to the mobile devices. In this case the mobile would be responsible for taking differences among the TOAs to convert them into TDOAs using equation (1) before estimating its position using equation (4) or (5). In other embodiments the TOAs, TDOAs, or combinations thereof are sent to the mobile devices from not just one but multiple APs.

It is also not necessary for the position coordinates of the APs to be sent to the mobile devices at the same time or in the same messages as the TOAs or TDOAs measured at the APs. The AP position information could be sent much less frequently because the APs themselves rarely change position. So, for example, the AP positions could be broadcast in the form of an "AP Position Info" message, say, once per ten seconds while the TOAs and/or TDOAs are broadcast once per second using a "TOA Info" message.

Regardless of how the TOAs or TDOAs are delivered to the mobile devices, once it is done and the mobiles have obtained the TDOAs $TDOA_{k,n,m}$ from the APs, the location coordinates $u_n$ of the APs and their own computed TDOAs $TDOA0_{n,m}$, the mobiles have all the information they need to self-locate by solving equations (4) or (5).

Equations (1) through (5) also assume that the receiving APs indexed by k and the transmitting APs indexed by n and m are physically the same APs, but this need not be the case. As long as the AP positions are known to the mobile devices, many different combinations of transmitting and receiving APs can be used. One group of APs can be used to perform all the transmissions while another completely different group is used for the receptions, or an identical group of APs can be used to perform both the transmissions and receptions, or some (but not all) of the transmitter APs can also be used as receiver APs.

Finally, referring to FIG. 1, it is worth mentioning that although we use the term "network access device" "or access points" to refer to the network node devices 120, providing network access to the mobile devices isn't a technical requirement for this invention per se; all that is required is that these devices periodically transmit location beacon signals to the mobile devices, along with their location coordinates and the measured TOAs and/or TDOAs of said location beacon signals.

Figure 3:
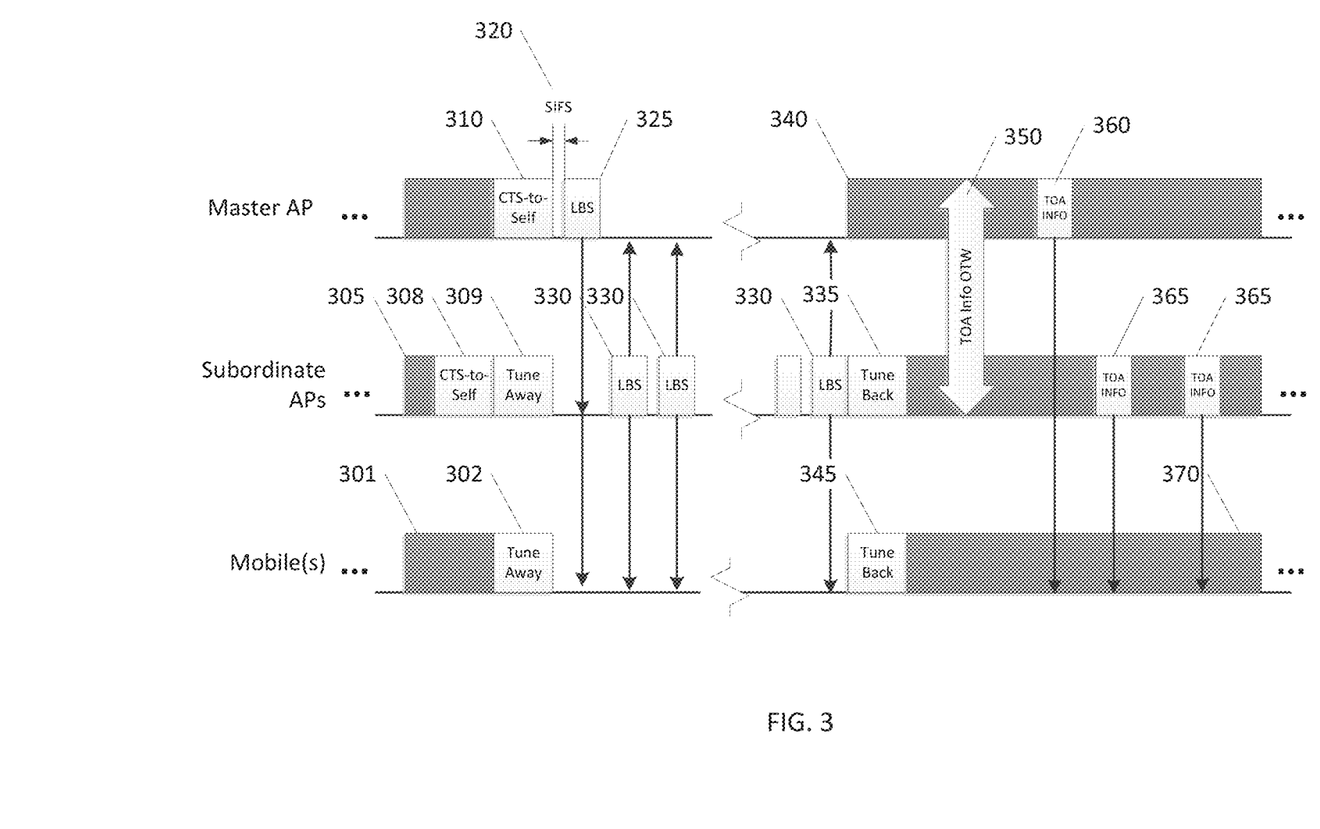
FIG. 3 is a timing diagram of a Location Beacon Signal (LBS) exchange, in accordance with various embodiments.

FIG. 3 shows a detailed timing diagram of an LBS exchange between the master AP, the subordinate APs and the mobiles. The master AP performs the following tasks to support AB-DTOF once per update interval:

1. Sends a CTS-to-Self 310 (alternatively a Quiet Period packet may be used) to prevent WiFi devices from transmitting on its traffic channel during the LBS exchange. To minimize the chances that the channel is busy during the CTS-to-Self transmission, the master AP can send it immediately after it transmits its WiFi Beacon packet.
2. Waits a SIFS interval 320 and then sends a LBS packet 325 and stores its TOD. The LBS packet can be defined to be any WiFi multicast packet, although in this example we will assume it's a CTS-to-Self packet, as this requires a shorter transmission time than more generic WiFi multicast packets.
3. Receives the LBS packets 330 from each subordinate AP and stores the channel frequency response information or any other information needed to compute the TOA for each of the received packets.
4. Resumes traffic operation 340 on its serving traffic channel and sets a timer to fire just before the next CTS-to-Self is to be sent out.
5. Estimates the TOA of each received LBS packet using the information stored in step 3.
6. Sends the TOAs to each subordinate AP in a "TOA INFO OTW" message 350 over-the-wire. The "TOA INFO OTW" message contains N TOAs, one for each AP in the cluster. The TOA of the LBS packet transmitted by the master AP is really its TOD that was stored in step 2.
7. Receives the TOAs and TODs from each subordinate AP via "TOA INFO OTW" messages 350 sent over the wire.
8. Sends a multicast "TOA INFO" message 360 on its serving traffic channel telling any listening mobiles both the position coordinates of the APs and the measured TOAs from each AP in the cluster. A total of $N^2$ APs are embedded in this message, i.e., the N measured TOAs for each of the N APs in the cluster.
9. Wait for the timer to fire from step 4, then go to step 1. Repeat ad-infinitum.

Each subordinate AP performs the following steps once per update interval. For the following description, assume the APs in each cluster are numbered 1-7 with the master AP being #7 and the subordinate APs being #1-6. Using this numbering system, subordinate AP #n with $1 \leq n \leq 6$, performs the following tasks once per update interval:

1. Performs normal traffic processing 305 on its traffic channel while waiting for an internal timer to fire when it is time to go off-channel to receive a LBS packet from the master AP. When the timer fires, sends a CTS-to-Self 308 to prevent WiFi devices from transmitting on its traffic channel during the LBS exchange, then tunes its PLL synthesizer 309 to the master AP's traffic channel frequency. To minimize the chances that the channel is busy during the CTS-to-Self transmission, the subordinate AP can align its Beacon so that it immediately precedes its CTS-to-Self transmission.
2. Receives the LBS packets 325 from the master AP and then 330 AP's #1 through n−1, and stores the channel frequency response information and any other information needed to compute the TOA for each received LBS packet.
3. Waits the required amount of time after the LBS packet from AP n−1 is received (e.g., a SIFS period), then sends a LBS packet and stores its TOD.
4. Receives the LBS packets 330 from the remaining subordinate AP's, i.e., APs n+1, ..., N. and stores the channel frequency response information and any other information needed to compute the TOA for each received LBS packet.
5. Tunes its PLL synthesizer back 335 to its own traffic channel, resumes normal traffic operation, and sets a timer to fire just before the next LBS exchange.
6. Estimates the TOA of each received LBS packet using the information stored in steps 2 and 4.
7. Sends the TOAs and TOD to the other APs in the cluster using a "TOA INFO OTW" message 350 over-the-wire. The "TOA INFO OTW" message contains N TOAs, one for each AP in the cluster. The TOA of the LBS packet transmitted by subordinate AP #n is really its TOD that was stored in step 3.
8. Receives the TOAs and TODs from the other APs in the cluster via "TOA INFO OTW" messages 350 sent over the wire.
9. Sends a multicast "TOA INFO" message 365 on its serving traffic channel telling any listening mobiles both the position coordinates of the APs and the measured TOAs from each AP in the cluster. A total of $N^2$ TOAs are embedded in this message, i.e., the N measured TOAs for each of the N APs in the cluster.
10. Waits for the timer to fire from step 5, then go to step 1. Repeat ad-infinitum.

Each mobile device performs the following tasks once per update interval:

1. Waits for an internal timer to fire 301 when it's time to go off-channel for the LBS exchange.
2. When the timer fires, tunes its PLL synthesizer 302 to the master AP's traffic channel frequency.
3. Receives the LBS packets 325 330 from each of the N APs and stores the channel frequency response information and any other information needed to compute the TOA for each received packet.
4. Tunes its PLL synthesizer back 345 to its traffic channel, resumes normal traffic operation, and sets a timer to fire just before the next LBS broadcast begins.
5. As a background task, computes the TOA of each received LBS packet using the information from step 3.
6. Computes the TDOAs $TDOA0_{n,m}$ as defined in equation (2) for all integers n and m between 1 and N using the TOAs computed in step 5.
7. Waits until it receives the "TOA Info" message 360 365 from its serving AP. Once it receives that message, computes the TDOAs TDOA$_{k,n,m}$ as defined in equation (1) for all integers n and m between 1 and N.
8. Estimates its position using equation (4) given the TDOAs TDOA0$_{n,m}$ and TDOA$_{k,n,m}$ and the known AP positions.
9. Waits 370 for the timer to fire from step 4, then go to step 1. Repeat ad-infinitum.

The following modifications could be made to the above procedures. First, as mentioned earlier, if it's impractical for the APs to compute the TODs for their transmitted LBS packets, they can ignore these steps and the mobile can estimate its position using equation (5) instead of (4) (with slightly degraded performance). Second, to minimize interference between clusters, one could coarsely synchronize their master APs to a global timing reference using NTP or IEEE 1588 so that all clusters perform their LBS exchanges at (approximately) the same time. This minimizes the chance that one cluster is doing an LBS exchange while another is doing traffic at the same time and frequency. It also prevents LBS exchanges from adjacent clusters from interfering with one another if the master APs in those clusters serve traffic at different frequencies.

Network Overhead Analysis

Each subordinate AP in the network goes off-channel for approximately $2T_{PLL}+(N+1)T_{Brcst}$ seconds per update interval to support the position location feature, where N is the number of APs per cluster, $T_{PLL}$ is the AP's PLL synthesizer settling time and $T_{Brcst}$ is the duration of the LBS packet plus any additional inter-packet spacing that's required. As an example, if a CTS-to-Self is used as the LBS packet with a 16 microsecond SIFS between packets (so that $T_{Brcst} \approx 50$ microseconds), $T_{PLL}=200$ microseconds, a cluster size of N=7 and an update interval of T=1 sec are used, each AP spends about 800 microseconds or only 0.08% of its time off-channel. This is a very small price to pay to add the self-location feature to the network. Note that the off-channel time doesn't depend on the number of mobiles that use the self-location feature.

Application to TF-WB Signaling

Time-Frequency Offset Wideband (TF-WB) signaling, described in U.S. Pat. No. 8,179,816, is a wireless signaling method in which a transmitter device sends a sequence of narrowband signals sequentially in time and at different frequencies to a receiver device in order to span a desired bandwidth. The receiver digitizes and stores the sequence of incoming transmissions, then uses the received sequence and the timing and carrier phase differences among the transmitted signals to estimate their time and/or angle of arrival. TF-WB is an important innovation because it allows today's wireless standards such as IEEE 802.11/WiFi to effectively transmit and receive ultra-wideband (UWB) signals for ToF-based positioning.

Figure 5:
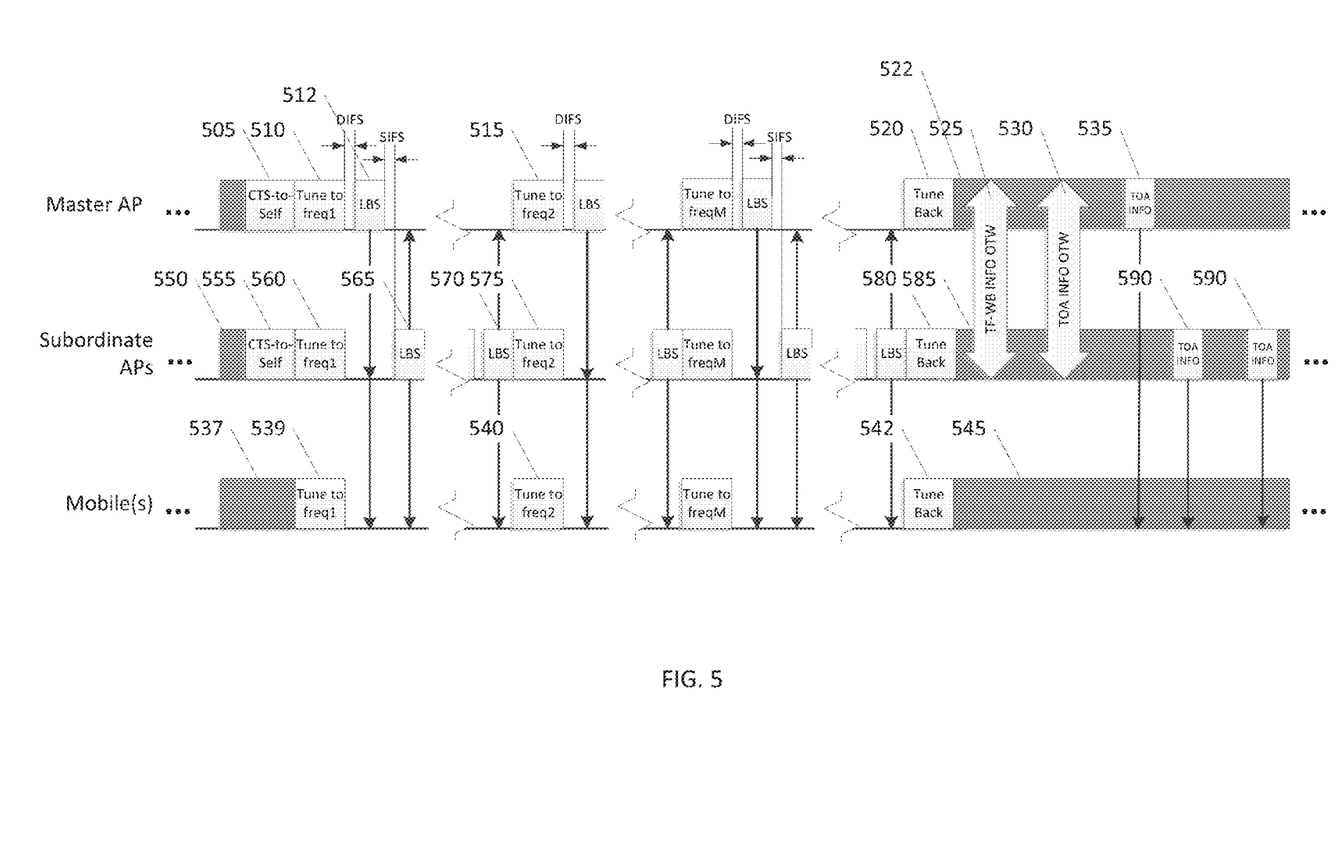
FIG. 5 shows a timing diagram of a Location Beacon Signal (LBS) exchange when Time-Frequency Offset Wideband Signaling is used in conjunction with the AB-DTOF approach, in accordance with various embodiments.

The AB-DTOF approach described herein can be augmented to support TF-WB signaling. Instead of broadcasting a LBS that's a single packet at a single center frequency, each AP would instead broadcast multiple packets at multiple frequencies. FIG. 5 describes how the approach would be modified to support TF-WB. The master AP performs the following tasks once per update interval:

1. Initializes freqCtr to 1.
2. Sends a CTS-to-Self 505 (alternatively a Quiet Period packet may be used) to prevent WiFi devices from transmitting on its traffic channel during the LBS exchange, then tunes its PLL synthesizer 510 to the first frequency in the TF-WB sequence. To minimize the chances that the channel is busy during the CTS-to-Self transmission, the master AP can send it immediately after it transmits its WiFi Beacon packet.
3. Once the synthesizer settles at the new frequency, performs the basic WiFi CSMA access procedure and waits until the channel is idle (if it is idle from the beginning only a DIFS is required), then sends a LBS packet 512 and stores its TOD and the carrier phase offset of transmission.
4. Receives the LBS packets 565 570 from each subordinate AP and stores the channel frequency response information and any other information needed to compute the TOA for each of these received packets.
5. After the Nth LBS packet 570 is received at that frequency, increments the frequency counter freqCtr. If freqCtr is less than or equal to the number of frequencies in the TF-WB sequence, tunes its PLL synthesizer 515 to the next frequency in the sequence, then goes to step 3. Otherwise, tunes back 520 to its traffic channel frequency.
6. Resumes traffic operation 522 on its traffic channel and sets a timer to fire just before the next LBS exchange.
7. Sends 525 the time and phase offsets of its LBS packet transmissions (this information is required for the APs to estimate the TOAs of their received TF-WB sequences) to the subordinate APs using a "TF-WB INFO OTW" message over the wire.
8. Receives the time and phase offsets of the LBS packet transmissions (this information is required for the APs to estimate the TOAs of the TF-WB sequences) from each subordinate AP via "TF-WB INFO OTW" messages 525 sent over the wire.
9. Estimates the TOA of each received TF-WB sequence (there are N−1 received sequences—one from each subordinate AP; the TOA of each sequence is the TOA of the first LBS packet in the sequence) using the information stored in steps 4 and 8.
10. Sends the TOAs to each subordinate AP in a "TOA INFO OTW" message over-the-wire. The "TOA INFO OTW" message contains N TOAs, one for each AP in the cluster. The TOA of the TF-WB sequence transmitted by the master AP is really the TOD of the first packet in the sequence that was stored in step 3.
11. Receives the TOAs and TODs from each subordinate AP via "TOA INFO OTW" messages 530 sent over the wire.
12. Sends a multicast "TOA INFO" message 535 on its traffic channel telling any listening mobiles all the measured TOAs plus the transmitted time offsets and carrier phase offsets from each AP in the cluster.
13. Wait for the timer to fire from step 6, then go to step 1. Repeat ad-infinitum.

Each subordinate AP performs the following steps once per update interval. For the following description, assume the APs in each cluster are numbered 1-7 with the master AP being #7 and the subordinate APs being #1-6. Using this numbering system, subordinate AP #n with 1≤n≤6, performs the following tasks once per update interval:

1. Initialize freqCtr to 1.
2. Performs normal traffic processing on its traffic channel while waiting 550 for an internal timer to fire when it's time to start the LBS exchange. When the timer fires, sends a CTS-to-Self 555 to prevent WiFi devices from transmitting on its traffic channel during the LBS exchange, then tunes its PLL synthesizer 560 to the first frequency in the LBS sequence. To minimize the chances that the channel is busy during the CTS-to-Self transmission, the subordinate AP can align its Beacon so that it immediately precedes the CTS-to-Self transmission.
3. Receives the LBS packets from the master AP 512 and then AP's #1 through n−1 565 and stores the channel frequency response information and any other information needed to compute the TOA for each received packet.

4. Waits the required amount of time after the LBS packet from AP n−1 is received (e.g., a SIFS period), then sends a LBS packet and stores its TOD and the carrier phase offset of the transmission.
5. Receives 570 the LBS packets from the remaining subordinate AP's, i.e., APs n+1, . . . , N. and stores the channel frequency response information and any other information needed to compute the TOA for each received packet.
6. After the Nth LBS packet 570 is received at that frequency, increments the frequency counter freqCtr. If freqCtr is less than or equal to the number of frequencies in the TF-WB sequence, tunes its PLL synthesizer 575 to the next frequency in the sequence, then go to step 3. Otherwise, tunes back 580 to its traffic channel frequency.
7. Resumes normal traffic operation 585 on its traffic channel and sets a timer to fire just before the next LBS exchange.
8. Sends 525 the time and phase offsets of its LBS packet transmissions to the other APs using a "TF-WB INFO OTW" message over the wire.
9. Receives the time and phase offsets of the LBS packet transmissions from the other APs via "TF-WB INFO OTW" messages 525 sent over the wire.
10. Estimates the TOA of each received TF-WB sequence using the information stored in steps 3, 5 and 9.
11. Sends the estimated TOAs 530 to the other APs in the cluster using a "TOA INFO OTW" message over-the-wire.
12. Receives the estimated TOAs 530 from the other APs in the cluster via "TOA INFO OTW" messages sent over the wire.
13. Sends a multicast "TOA INFO" message 590 on its traffic channel telling any listening mobiles all the measured TOAs plus the transmitted time offsets and carrier phase offsets from each AP in the cluster.
14. Waits for the timer to fire from step 7, then go to step 1. Repeat ad-infinitum.

The mobile devices perform the following tasks once per update interval:
1. Wait 537 for an internal timer to fire when it's time to go off-channel to receive LBSs from the APs.
2. When the timer fires, tune their PLL synthesizer 539 to the first frequency in the TF-WB sequence.
3. Receive the LBS packets 512 565 570 from each of the N APs at the first frequency in the sequence and store the channel frequency response information and any other information needed to compute the TOA for each received packet.
4. Tune their PLL synthesizers 540 to the next frequency in the sequence and wait for it to settle.
5. Repeat steps 3 and 4 for all frequencies in the TF-WB sequence.
6. Tune their PLL synthesizer back 542 to their traffic channel, resume normal traffic operation, and set a timer to fire just before the next LBS exchange begins.
7. Wait until they receive the "TOA Info" message from their serving AP 535 590 containing (1) the APs' position coordinates, (2) the APs' TOAs (there are N TOAs for each of the N APs for a total of $N^2$ TOAs in the "TOA Info" message) and the time and phase offsets for each AP's TF-WB transmissions (there are (M−1) time offsets and (M−1) phase offsets for each of the N APs for a total of 2N (M−1) offsets in the "TOA Info" message). Once they receive that message, compute the TOA of each received TF-WB sequence using the information received in steps 3 and 5 and the time and phase offsets from the "TOA Info" message.
8. Compute the TDOAs $TDOA0_{n,m}$ as defined in equation (2) using the TOAs computed in step 7.
9. Compute the TDOAs $TDOA_{k,n,m}$ as defined in equation (1) using the TOAs received from the APs in the "TOA Info" message.
10. Estimate their position using equation (4) given the TDOAs $TDOA0_{n,m}$ and $TDOA_{k,n,m}$ and the known AP positions from the "TOA Info" message.
11. Wait for the timer to fire from step 6, then go to step 1 and repeat ad-infinitum.

The following modifications could be made to the above procedures. First, if the APs or mobile devices are unable to determine the time or phase offsets of their transmissions, the APs could use overlapping transmissions and allow the receiving APs and/or the mobiles to estimate the time and phase offsets from those overlapping transmissions, as described in U.S. patent application Ser. No. 13/891,123 filed on May 9, 2013. Second, to minimize interference between clusters, one could coarsely synchronize their master APs to a global timing reference using NTP or IEEE 1588 so that all clusters perform their LBS exchanges at (approximately) the same time. This minimizes the chance that one cluster is doing an LBS exchange while another is doing traffic at the same time and frequency. It also prevents LBS exchanges from adjacent clusters from interfering with one another if the master APs in those clusters serve traffic at different frequencies.

For the TF-WB approach, each AP in the network goes off-channel for approximately $(M+1)T_{PLL}+NMT_{Brcst}$ seconds per update interval to support the position location feature, where N is the number of APs per cluster, $T_{PLL}$ is the AP's PLL synthesizer settling time, M is the number of frequencies per transmitted TF-WB sequence, and $T_{Brcst}$ is the duration of the LBS packet plus any additional inter-packet spacing that's required. As an example, if a CTS-to-Self is used as the LBS packet with a 16 microsecond SIFS between packets (so that $T_{Brcst} \approx 50$ microseconds), $T_{PLL}=200$ microseconds, M=8 frequencies per TF-WB transmission, a cluster size of N=7 and an update interval of T=1 sec are used, each AP spends about 4.6 milliseconds or 0.46% of its time off-channel.

Positioning System Including Network Access Devices

Returning to FIG. 1, an exemplary position system 100 includes N network access devices 120. N is greater than 2. Each network access device in a first subset of N1 of the N network access devices 120 transmits a wireless location beacon signal, producing N1 wireless location beacon signals that are transmitted by the first subset. N1 is at least 2.

Each network access device in a second subset of N2 of the N network access devices 120 receives the N1 wireless location beacon signals from the first subset and calculates N1 TOAs from each of the N1 received wireless location beacon signals, producing N1×N2 calculated TOAs by the second subset. N2 is at least 2.

Using one or more wireless transmissions, one or more network access devices of the N network access devices 120 transmit location coordinates of the N network access devices 120 and transmit the N1×N2 calculated TOAs, differences calculated among the N1×N2 calculated TOAs, or a combination of one or more of the N1×N2 calculated TOAs and one or more of the differences calculated among the N1×N2 calculated TOAs.

There are many ways to partition the task of transmitting the location coordinates and the TOAs and/or TDOAs (i.e., the differences among the TDOAs). For example, one possibility is for the one network access device to transmit the location coordinates of all N network access devices and all of the TOAs and/or TDOAs using a single over-the-air message. A second possibility is for one network access device to transmit the location coordinates using one message while another transmits the TOAs and/or TDOAs using another message. Another possibility is for a first network access device to transmit half of the location coordinates using two messages while a second network access device transmits the remaining location coordinates using five messages, a third network access device transmits the TOAs measured at the first two network access devices using one message and a forth network access device sends the TDOAs measured at the remaining N−2 network access devices using three messages.

At least one mobile device 110, for example, receives the N1 wireless location beacon signals, the location coordinates of the N network access devices 120, and the N1×N2 calculated TOAs, differences calculated among the N1×N2 calculated TOAs, or a combination of one or more the N1×N2 calculated TOAs and one or more of the differences calculated among the N1×N2 calculated TOAs. The at least one mobile device 110 calculates a location of the at least one mobile device 110 from the N1 wireless location beacon signals, the location coordinates of the N network access devices 120, and the N1×N2 calculated TOAs, differences calculated among the N1×N2 calculated TOAs, or a combination of one or more the N1×N2 calculated TOAs and one or more of the differences calculated among the N1×N2 calculated TOAs.

In various embodiments, the wireless location beacon signal transmissions from the first subset of N1 of the N network access devices are performed in predetermined sequence and are triggered periodically using a common time reference. In various alternative embodiments, the wireless location beacon signal transmissions from the first subset of N1 of the N network access devices are performed in predetermined sequence and are triggered by receipt of a transmission from a previous network access device in the predetermined sequence.

In various embodiments, each wireless location beacon signal of the N1 wireless location beacon signals comprises a sequence of two or more data packets sent sequentially in time and at different center frequencies in order to span a desired bandwidth. The N1×N2 calculated TOAs are calculated from the wireless location beacon signal using one or more of the received sequence of data packets, the different center frequencies, information from the two or more data packets, and any transmitted time differences and/or carrier phase differences among the two or more data packets.

In various embodiments, the first subset of N1 of the N network access devices 120 and the second subset of N2 of the N network access devices 120 are mutually exclusive. In other words, the first subset and the second subset do not share any of the N network access devices 120.

In various embodiments, the first subset of N1 of the N network access devices 120 and the second subset of N2 of the N network access devices 120 are not mutually exclusive. In other words, the first subset and the second subset can share one or more network access devices of the N network access devices 120.

In various embodiments, each network access device in the second subset of N2 of the N network access devices does not transmit a response signal after receiving a wireless location beacon signal. In other words, the wireless location beacon signal transmissions from the first subset of N1 of the N network access devices are not part of a round-trip-time (RTT) measurement.

In various embodiments, each network access device in the first subset of N1 of the N network access devices 120 further measures a time of departure (TOD) of the wireless location beacon signal transmitted by each network device in the first subset, producing N1 TOD measurements by the first subset. Using the one or more wireless transmissions, the one or more network access devices of the N network access devices further transmit the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs. The at least one mobile device, for example, further receives the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs. The at least one mobile device then calculates the location of the at least one mobile device additionally using the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs.

Positioning System Including a Mobile Device

Returning again to FIG. 1, another exemplary position system 100 include at least one mobile device 110 that receives N1 wireless location beacon signals, location coordinates of N network access devices 120, and N1×N2 calculated TOAs, differences calculated among the N1×N2 calculated TOAs, or a combination of one or more the N1×N2 calculated TOAs and one or more of the differences calculated among the N1×N2 calculated TOAs. The at least one mobile device 110 calculates a location of the at least one mobile device 110 from the N1 wireless location beacon signals, the location coordinates of the N network access devices 120, and the N1×N2 calculated TOAs, differences calculated among the N1×N2 calculated TOAs, or a combination of one or more the N1×N2 calculated TOAs and one or more of the differences calculated among the N1×N2 calculated TOAs.

N is greater than 2.

Each network access device in a first subset of N1 of the N network access devices 120 transmits a wireless location beacon signal, producing the N1 wireless location beacon signals that are transmitted by the first subset. N1 is at least 2.

Each network access device in a second subset of N2 of the N network access devices 120 receives the N1 wireless location beacon signals from the first subset and calculates N1 TOAs from each of the N1 received wireless location beacon signals, producing the N1×N2 calculated TOAs by the second subset. N2 is at least 2.

Using one or more wireless transmissions, one or more network access devices of the N network access devices 120 transmit location coordinates of the N network access devices 120 and transmit the N1×N2 calculated TOAs, differences calculated among the N1×N2 calculated TOAs, or a combination of one or more of the N1×N2 calculated TOAs and one or more of the differences calculated among the N1×N2 calculated TOAs.

Method for Locating a Mobile Device using Network Access Devices

Figure 6:
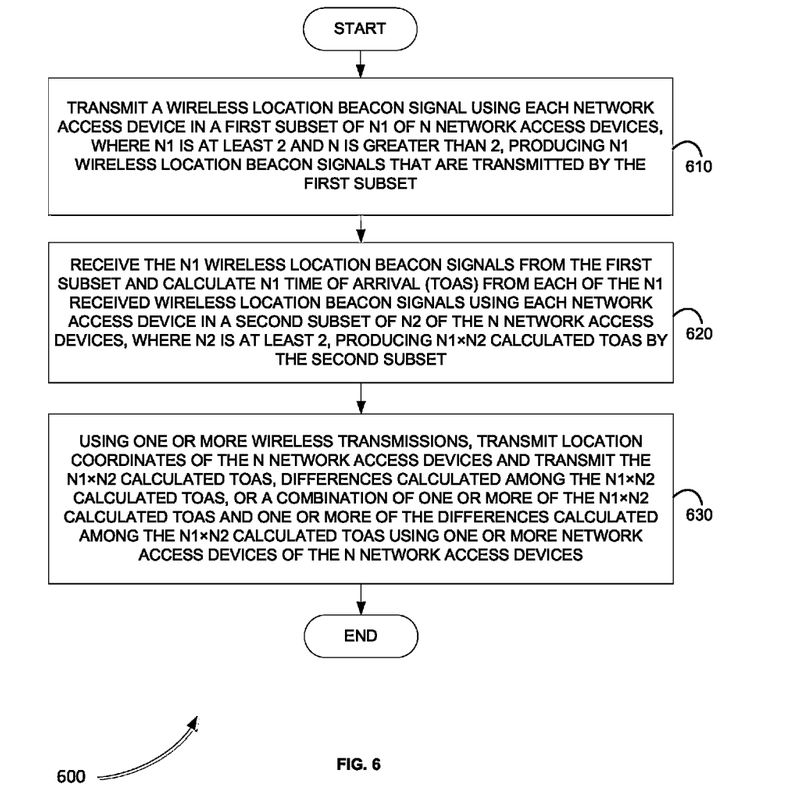
FIG. 6 is an exemplary flowchart showing a method for locating a mobile device from the perspective of multiple network access devices, in accordance with various embodiments.

FIG. 6 is an exemplary flowchart showing a method 600 for locating a mobile device from the perspective of multiple network access devices, in accordance with various embodiments.

In step 610 of method 600, a wireless location beacon signal is transmitted using each network access device in a first subset of N1 of N network access devices. N1 is at least 2 and N is greater than 2. N1 wireless location beacon signals are produced that are transmitted by the first subset.

In step 620, the N1 wireless location beacon signals from the first subset are received and N1 time of arrivals (TOAs) are calculated from each of the N1 received wireless location beacon signals using each network access device in a second subset of N2 of the N network access devices. N2 is at least 2. N1×N2 calculated TOAs are produced by the second subset.

In step 630, using one or more wireless transmissions, location coordinates of the N network access devices are transmitted and the N1×N2 calculated TOAs, differences calculated among the N1×N2 calculated TOAs, or a combination of one or more of the N1×N2 calculated TOAs and one or more of the differences calculated among the N1×N2 calculated TOAs are transmitted using one or more network access devices of the N network access devices.

At least one mobile device, for example, receives the N1 wireless location beacon signals, the location coordinates of the N network access devices, and the N1×N2 calculated TOAs, differences calculated among the N1×N2 calculated TOAs, or a combination of one or more the N1×N2 calculated TOAs and one or more of the differences calculated among the N1×N2 calculated TOAs. The at least one mobile device calculates its location from the N1 wireless location beacon signals, the location coordinates of the N network access devices, and the N1×N2 calculated TOAs, differences calculated among the N1×N2 calculated TOAs, or a combination of one or more the N1×N2 calculated TOAs and one or more of the differences calculated among the N1×N2 calculated TOAs.

Method for Locating a Mobile Device Using the Mobile Device

Figure 7:
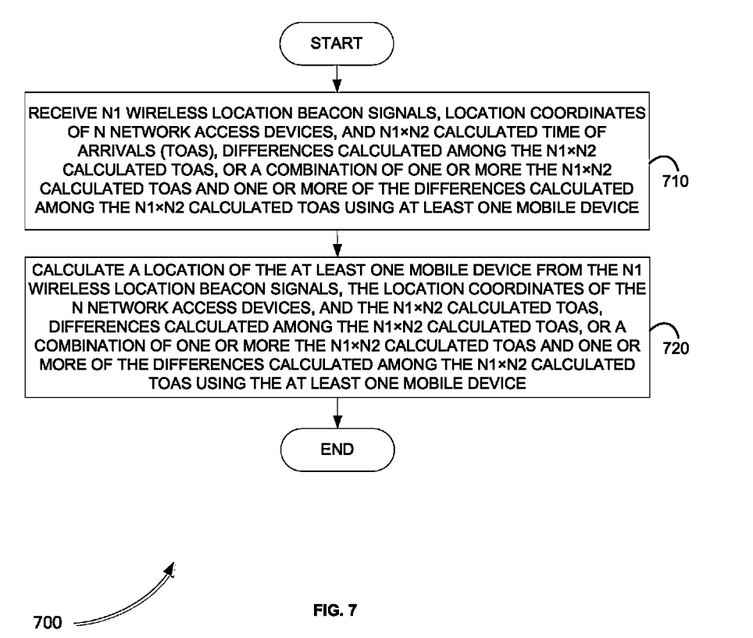
FIG. 7 is an exemplary flowchart showing a method for locating a mobile device from the perspective of the mobile device, in accordance with various embodiments.

FIG. 7 is an exemplary flowchart showing method 700 for locating a mobile device from the perspective of the mobile device, in accordance with various embodiments.

In step 710 of method 700, N1 wireless location beacon signals, location coordinates of N network access devices, and N1×N2 calculated time of arrivals (TOAs), differences calculated among the N1×N2 calculated TOAs, or a combination of one or more the N1×N2 calculated TOAs and one or more of the differences calculated among the N1×N2 calculated TOAs are received using at least one mobile device.

In step 720, a location of the at least one mobile device is calculated from the N1 wireless location beacon signals, the location coordinates of the N network access devices, and the N1×N2 calculated TOAs, differences calculated among the N1×N2 calculated TOAs, or a combination of one or more the N1×N2 calculated TOAs and one or more of the differences calculated among the N1×N2 calculated TOAs using the at least one mobile device.

For example, N is greater than 2. Each network access device in a first subset of N1 of the N network access devices transmits a wireless location beacon signal, producing the N1 wireless location beacon signals that are transmitted by the first subset. N1 is at least 2. Each network access device in a second subset of N2 of the N network access devices receives the N1 wireless location beacon signals from the first subset and calculates N1 TOAs from each of the N1 received wireless location beacon signals, producing the N1×N2 calculated TOAs by the second subset. N2 is at least 2. Using one or more wireless transmissions, one or more network access devices of the N network access devices transmit location coordinates of the N network access devices and transmit the N1×N2 calculated TOAs, differences calculated among the N1×N2 calculated TOAs, or a combination of one or more of the N1×N2 calculated TOAs and one or more of the differences calculated among the N1×N2 calculated TOAs.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A positioning system, comprising
  N network access devices, wherein N is greater than 2, wherein
  each network access device in a first subset of N1 of the N network access devices, wherein N1 is at least 2, transmits a wireless location beacon signal, producing N1 wireless location beacon signals that are transmitted by the first subset,
  each network access device in a second subset of N2 of the N network access devices, wherein N2 is at least 2, receives the N1 wireless location beacon signals from the first subset and calculates N1 time of arrivals (TOAs) from each of the N1 received wireless location beacon signals, producing N1×N2 calculated TOAs by the second subset,
  using one or more wireless transmissions, one or more network access devices of the N network access devices transmit location coordinates of the N network access devices and transmit the N1×N2 calculated TOAs, differences calculated among the N1×N2 calculated TOAs, or a combination of one or more of the N1×N2 calculated TOAs and one or more of the differences calculated among the N1×N2 calculated TOAs, and
  at least one mobile device that
    receives the N1 wireless location beacon signals, the location coordinates of the N network access devices, and the N1×N2 calculated TOAs, differences calculated among the N1×N2 calculated TOAs, or a combination of one or more the N1×N2 calculated TOAs and one or more of the differences calculated among the N1×N2 calculated TOAs, and
    calculates a location of the at least one mobile device from the N1 wireless location beacon signals, the location coordinates of the N network access devices, and the N1×N2 calculated TOAs, differences calculated among the N1×N2 calculated TOAs, or a combination of one or more the N1×N2 calculated TOAs and one or more of the differences calculated among the N1×N2 calculated TOAs.

2. The system of claim 1, wherein
  each network access device in the first subset of N1 of the N network access devices further measures a time of departure (TOD) of the wireless location beacon signal transmitted by the each network device in the first subset, producing N1 TOD measurements by the first subset, using the one or more wireless transmissions, the one or more network access devices of the N network access devices further transmit the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs, and the at least one mobile device further receives the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs and calculates the location of the at least one mobile device additionally using the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs.

3. The system of claim 1, wherein the wireless location beacon signal transmissions from the first subset of N1 of the N network access devices are performed in predetermined sequence and are triggered periodically using a common time reference.

4. The system of claim 1, wherein the wireless location beacon signal transmissions from the first subset of N1 of the N network access devices are performed in predetermined sequence and are triggered by receipt of a transmission from a previous network access device in the predetermined sequence.

5. The system of claim 1, wherein each network access device in the second subset of N2 of the N network access devices does not transmit a response signal after receiving a wireless location beacon signal.

6. The system of claim 1, wherein each wireless location beacon signal of the N1 wireless location beacon signals comprises a sequence of two or more data packets sent sequentially in time and at different center frequencies in order to span a desired bandwidth and the N1×N2 calculated TOAs are calculated from the wireless location beacon signal using one or more of the received sequence of data packets, the different center frequencies, information from the two or more data packets, and any transmitted time differences and/or carrier phase differences among the two or more data packets.

7. The system of claim 1, wherein the first subset and the second subset are not mutually exclusive.

8. The system of claim 1, wherein the first subset and the second subset are mutually exclusive.

9. A method for locating a mobile device, comprising transmitting a wireless location beacon signal using each network access device in a first subset of N1 of N network access devices, wherein N1 is at least 2 and N is greater than 2, producing N1 wireless location beacon signals that are transmitted by the first subset;

receiving the N1 wireless location beacon signals from the first subset and calculating N1 time of arrivals (TOAs) from each of the N1 received wireless location beacon signals using each network access device in a second subset of N2 of the N network access devices, wherein N2 is at least 2, producing N1×N2 calculated TOAs by the second subset; and using one or more wireless transmissions, transmitting location coordinates of the N network access devices and transmitting the N1×N2 calculated TOAs, differences calculated among the N1×N2 calculated TOAs, or a combination of one or more of the N1×N2 calculated TOAs and one or more of the differences calculated among the N1×N2 calculated TOAs using one or more network access devices of the N network access devices, wherein at least one mobile device receives the N1 wireless location beacon signals, the location coordinates of the N network access devices, and the N1×N2 calculated TOAs, differences calculated among the N1×N2 calculated TOAs, or a combination of one or more the N1×N2 calculated TOAs and one or more of the differences calculated among the N1×N2 calculated TOAs, and calculates a location of the at least one mobile device from the N1 wireless location beacon signals, the location coordinates of the N network access devices, and the N1×N2 calculated TOAs, differences calculated among the N1×N2 calculated TOAs, or a combination of one or more the N1×N2 calculated TOAs and one or more of the differences calculated among the N1×N2 calculated TOAs.

10. The method of claim 9, further comprising:

measuring a time of departure (TOD) of the wireless location beacon signal transmitted by the each network device in the first subset using each network access device in the first subset of N1 of the N network access devices, producing N1 TOD measurements by the first subset; and using the one or more wireless transmissions, transmitting the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs using the one or more network access devices of the N network access devices, wherein the at least one mobile device further receives the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs and calculates the location of the at least one mobile device additionally using the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs.

11. The method of claim 9, wherein the wireless location beacon signal transmissions from the first subset of N1 of the N network access devices are performed in predetermined sequence and are triggered periodically using a common time reference.

12. The method of claim 9, wherein the wireless location beacon signal transmissions from the first subset of N1 of the N network access devices are performed in predetermined sequence and are triggered by receipt of a transmission from a previous network access device in the predetermined sequence.

13. The method of claim 9, wherein each network access device in the second subset of N2 of the N network access devices does not transmit a response signal after receiving a wireless location beacon signal.

14. The method of claim 9, wherein each wireless location beacon signal of the N1 wireless location beacon signals comprises a sequence of two or more data packets sent sequentially in time and at different center frequencies in order to span a desired bandwidth and the N1×N2 calculated TOAs are calculated from the wireless location beacon signal using one or more of the received sequence of data packets, the different center frequencies, information from the two or more data packets, and any transmitted time differences and/or carrier phase differences among the two or more data packets.

15. The method of claim 9, wherein the first subset and the second subset are not mutually exclusive.

16. The method of claim 9, wherein the first subset and the second subset are mutually exclusive.

17. A positioning system, comprising
at least one mobile device that
receives N1 wireless location beacon signals, location coordinates of N network access devices, and N1×N2 calculated time of arrivals (TOAs), differences calculated among the N1×N2 calculated TOAs, or a combination of one or more the N1×N2 calculated TOAs and one or more of the differences calculated among the N1×N2 calculated TOAs, and
calculates a location of the at least one mobile device from the N1 wireless location beacon signals, the location coordinates of the N network access devices, and the N1×N2 calculated TOAs, differences calculated among the N1×N2 calculated TOAs, or a combination of one or more the N1×N2 calculated TOAs and one or more of the differences calculated among the N1×N2 calculated TOAs, wherein
N is greater than 2,
each network access device in a first subset of N1 of the N network access devices, wherein N1 is at least 2, transmits a wireless location beacon signal, producing the N1 wireless location beacon signals that are transmitted by the first subset,
each network access device in a second subset of N2 of the N network access devices, wherein N2 is at least 2, receives the N1 wireless location beacon signals from the first subset and calculates N1 TOAs from each of the N1 received wireless location beacon signals, producing the N1×N2 calculated TOAs by the second subset, and
using one or more wireless transmissions, one or more network access devices of the N network access devices transmit location coordinates of the N network access devices and transmit the N1×N2 calculated TOAs, differences calculated among the N1×N2 calculated TOAs, or a combination of one or more of the N1×N2 calculated TOAs and one or more of the differences calculated among the N1×N2 calculated TOAs.

18. The system of claim 17, wherein
the at least one mobile device further
receives N1 time of departure (TOD) measurements, differences calculated among the N1 calculated TODs and the N1×N2 TOAs, or a combination of one or more of the N1 calculated TODs and one or more of the differences calculated among the N1 calculated TODs and the N1×N2 calculated TOAs and
calculates the location of the at least one mobile device additionally using the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs, wherein
each network access device in the first subset of N1 of the N network access devices further measures a TOD of the wireless location beacon signal transmitted by the each network device in the first subset, producing N1 TOD measurements by the first subset and
using the one or more wireless transmissions, the one or more network access devices of the N network access devices further transmit the N1 TOD measurements, the differences calculated among the N1 calculated TODs and the N1×N2 TOAs, or a combination of one or more of the N1 calculated TODs and one or more of the differences calculated among the N1 calculated TODs and the N1×N2 calculated TOAs.

19. The system of claim 17, wherein the wireless location beacon signal transmissions from the first subset of N1 of the N network access devices are performed in predetermined sequence and are triggered periodically using a common time reference.

20. The system of claim 17, wherein the wireless location beacon signal transmissions from the first subset of N1 of the N network access devices are performed in predetermined sequence and are triggered by receipt of a transmission from a previous network access device in the predetermined sequence.

21. The system of claim 17, wherein each network access device in the second subset of N2 of the N network access devices does not transmit a response signal after receiving a wireless location beacon signal.

22. The system of claim 17, wherein each wireless location beacon signal of the N1 wireless location beacon signals comprises a sequence of two or more data packets sent sequentially in time and at different center frequencies in order to span a desired bandwidth and the N1×N2 calculated TOAs are calculated from the wireless location beacon signal using one or more of the received sequence of data packets, the different center frequencies, information from the two or more data packets, and any transmitted time differences and/or carrier phase differences among the two or more data packets.

23. The system of claim 17, wherein the first subset and the second subset are not mutually exclusive.

24. The system of claim 17, wherein the first subset and the second subset are mutually exclusive.

25. A method for locating a mobile device, comprising
receiving N1 wireless location beacon signals, location coordinates of N network access devices, and N1×N2 calculated time of arrivals (TOAs), differences calculated among the N1×N2 calculated TOAs, or a combination of one or more the N1×N2 calculated TOAs and one or more of the differences calculated among the N1×N2 calculated TOAs using at least one mobile device; and
calculating a location of the at least one mobile device from the N1 wireless location beacon signals, the location coordinates of the N network access devices, and the N1×N2 calculated TOAs, differences calculated among the N1×N2 calculated TOAs, or a combination of one or more the N1×N2 calculated TOAs and one or more of the differences calculated among the N1×N2 calculated TOAs using the at least one mobile device, wherein
N is greater than 2, each network access device in a first subset of N1 of the N network access devices, wherein N1 is at least 2, transmits a wireless location beacon signal, producing the N1 wireless location beacon signals that are transmitted by the first subset, each network access device in a second subset of N2 of the N network access devices, wherein N2 is at least 2, receives the N1 wireless location beacon signals from the first subset and calculates N1 TOAs from each of the N1 received wireless location beacon signals, producing the N1×N2 calculated TOAs by the second subset, and using one or more wireless transmissions, one or more network access devices of the N network access devices transmit location coordinates of the N network access devices and transmit the N1×N2 calculated TOAs, differences calculated among the N1×N2 calculated TOAs, or a combination of one or more of the N1×N2 calculated TOAs and one or more of the differences calculated among the N1×N2 calculated TOAs.

26. The method of claim 25, further comprising receiving N1 time of departure (TOD) measurements, differences calculated among the N1 calculated TODs and the N1×N2 TOAs, or a combination of one or more of the N1 calculated TODs and one or more of the differences calculated among the N1 calculated TODs and the N1×N2 calculated TOAs using the at least one mobile device; and calculating the location of the at least one mobile device additionally using the N1 TOD measurements, differences calculated among the N1 calculated TODs and the N1×N2 TOAs, or a combination of one or more of the N1 calculated TODs and one or more of the differences calculated among the N1 calculated TODs and the N1×N2 calculated TOAs using the at least one mobile device, wherein each network access device in the first subset of N1 of the N network access devices further measures a TOD of the wireless location beacon signal transmitted by the each network device in the first subset, producing N1 TOD measurements by the first subset; and using the one or more wireless transmissions, the one or more network access devices of the N network access devices further transmits the N1 TOD measurements, the differences calculated among the N1 calculated TODs and the N1×N2 TOAs, or a combination of one or more of the N1 calculated TODs and one or more of the differences calculated among the N1 calculated TODs and the N1×N2 calculated TOAs.

27. The method of claim 25, wherein each network access device in the second subset of N2 of the N network access devices does not transmit a response signal after receiving a wireless location beacon signal.

28. The method of claim 25, wherein each wireless location beacon signal of the N1 wireless location beacon signals comprises a sequence of two or more data packets sent sequentially in time and at different center frequencies in order to span a desired bandwidth and the N1×N2 calculated TOAs are calculated from the wireless location beacon signal using one or more of the received sequence of data packets, the different center frequencies, information from the two or more data packets, and any transmitted time differences and/or carrier phase differences among the two or more data packets.

29. The method of claim 25, wherein the first subset and the second subset are not mutually exclusive.

30. The method of claim 25, wherein the first subset and the second subset are mutually exclusive.

* * * * *